May 21, 1963

C. B. NAGELMANN 3,090,366

POWER PLANT HAVING ALIGNED RECIPROCATING
COMPRESSOR AND ENGINE

Filed Nov. 14, 1960

Clemens B. Nagelmann
INVENTOR.

BY *Clarence A. O'Brien*
and *Harvey B. Jacobson*
Attorneys

May 21, 1963

C. B. NAGELMANN 3,090,366

POWER PLANT HAVING ALIGNED RECIPROCATING
COMPRESSOR AND ENGINE

Filed Nov. 14, 1960

Clemens B. Nagelmann
INVENTOR.

BY *Clarence A. O'Brien*
*and Harvey B. Jacobson*
Attorneys

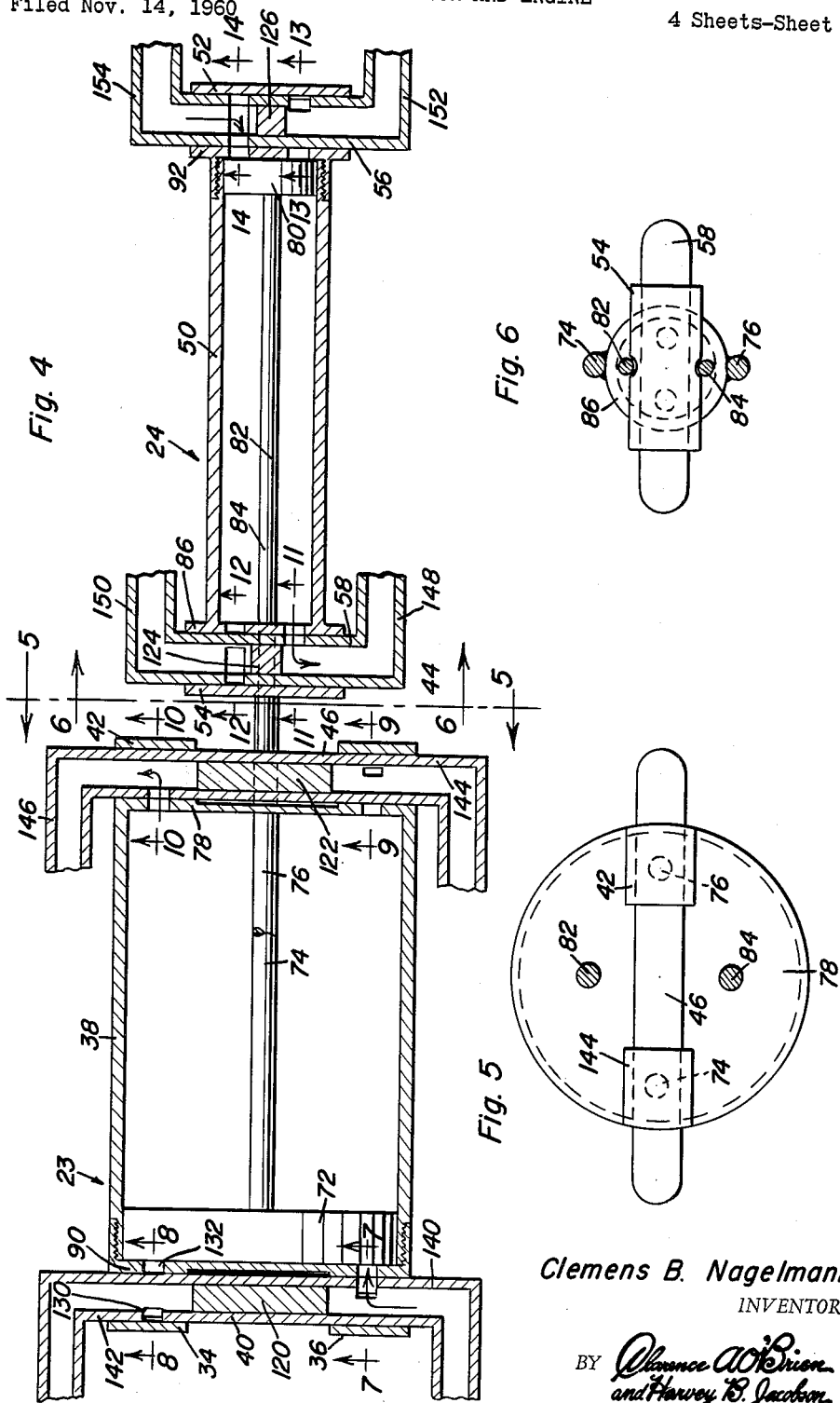

May 21, 1963  
C. B. NAGELMANN  
POWER PLANT HAVING ALIGNED RECIPROCATING COMPRESSOR AND ENGINE  
3,090,366
Filed Nov. 14, 1960
4 Sheets-Sheet 4
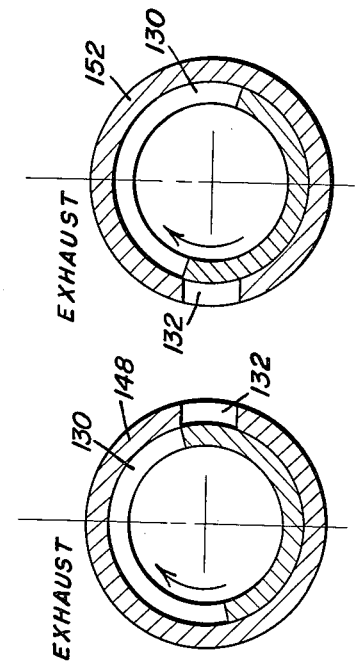
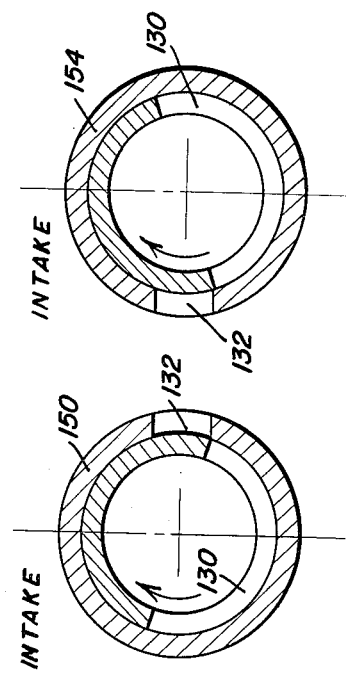
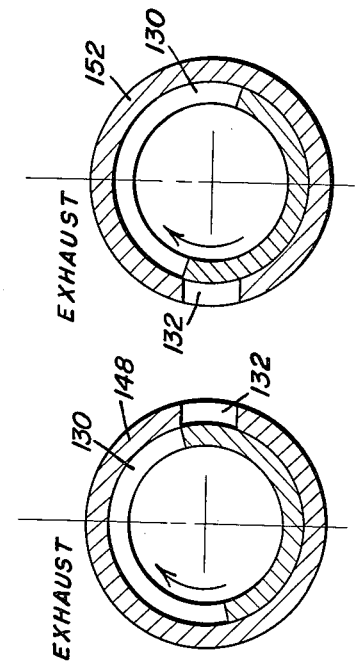
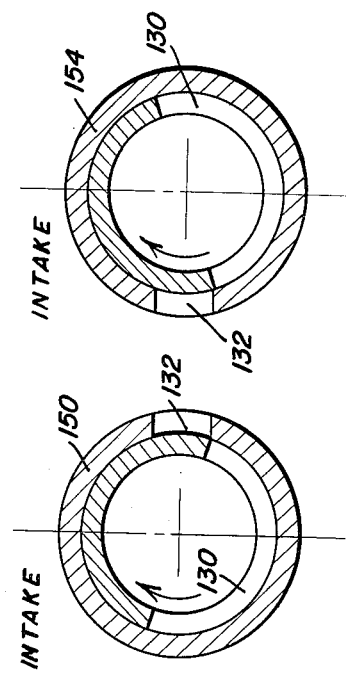
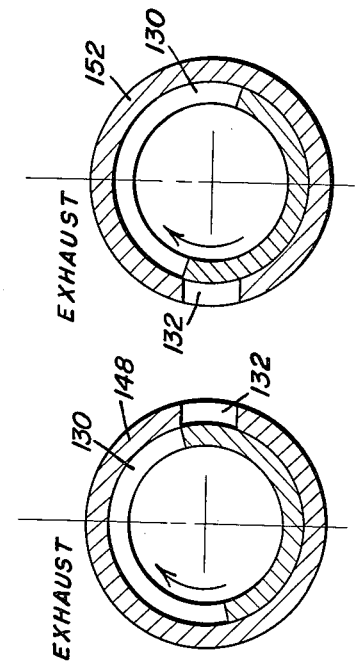
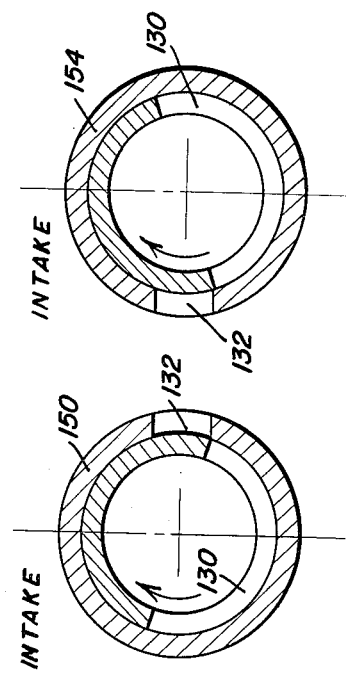
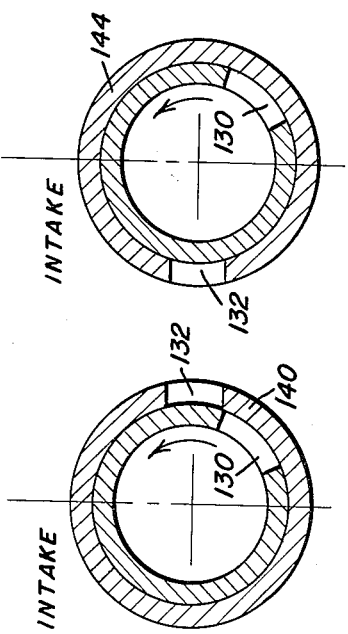
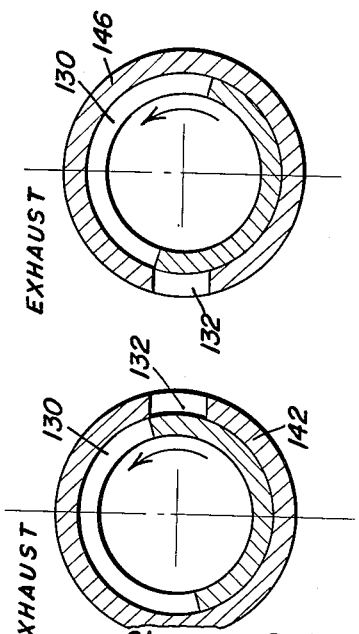
Clemens B. Nagelmann
INVENTOR.
BY Clarence A. O'Brien
and Harvey B. Jacobson
Attorneys

United States Patent Office 3,090,366
Patented May 21, 1963

3,090,366
POWER PLANT HAVING ALIGNED RECIPROCATING COMPRESSOR AND ENGINE
Clemens B. Nagelmann, Santa Barbara, Calif.
Filed Nov. 14, 1960, Ser. No. 68,802
14 Claims. (Cl. 123—42)

This invention comprises a novel and useful combined compressor and engine and more particularly relates to a power plant which is somewhat similar to that disclosed in my prior Patent No. 2,929,205, of March 22, 1960, but constitutes an improvement thereover.

The primary object of this invention is to provide an engine suitable for use as a power plant and capable of efficiently burning gasoline in an excess of air in order to obtain a very complete combustion of the fuel.

A further object of the invention is to provide an engine in which the mixture of fuel and air is burned without a sudden explosion or sudden rise in pressure and thus will approximate the characteristics of a heat engine in obtaining a smooth and substantially uniform application of pressure to the pistons of the engine during the working stroke of the latter.

A further object of the invention is to provide a power plant in which a working cylinder and piston unit is associated with a compressor cylinder and piston unit in an improved compact arrangement.

Yet another object of the invention is to provide an engine combining working and compressor units in such a manner as to obtain a relatively short over-all length, a relatively long operating stroke of the pistons in their cylinders, to reduce the shifting side thrusts common to the reciprocating piston type of engine and thereby minimize wear between the cylinders and pistons.

A still further object of the invention is to provide an engine in which working cylinder and compressor cylinder units are combined in a greatly improved relationship and with the piston of one unit being rigidly connected with the cylinder of the other unit and wherein the two cylinder units are mounted for rotation about spaced parallel axes in a synchronized relation but in opposite directions to effect a long stroke in the units.

Yet another object of the invention is to provide an engine in accordance with the foregoing objects wherein the working cylinder unit and the compressor cylinder unit are housed in an enclosing casing or container which journals the various shafts of the engine, encloses the moving parts of the engine and also constitutes a compressed air reservoir for the device as well as serves as a temperature equalizing means between the two units of the engine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a detail view taken in horizontal section upon an enlarged scale of a portion of the mechanism and showing the valve arrangement and the association of the same with the two units of the device;

FIGURE 5 is a vertical transverse sectional view taken substantially upon the plane indicated by the section line 5—5 of FIGURE 4 and showing in an end view the working cylinder unit of the device;

FIGURE 6 is a view similar to FIGURE 5 but taken upon the section line 6—6 of FIGURE 4 and showing in an end view the compressor unit of the device; and FIGURES 7–14 are detail views taken upon the correspondingly numbered section lines of FIGURE 4 and showing the rotary control valve arrangement in accordance with the invention.

Figure 1:
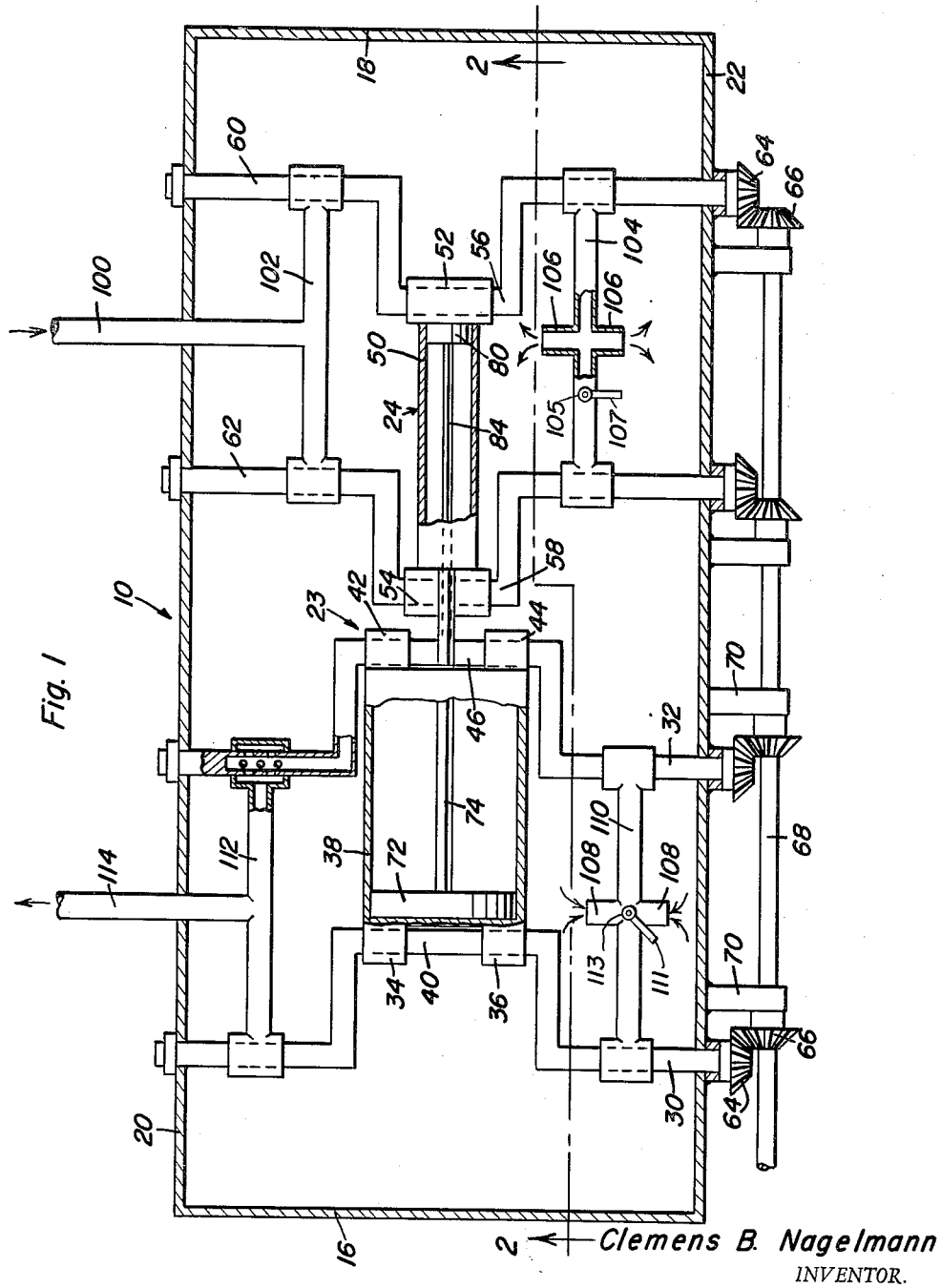
FIGURE 1 is a view in horizontal section, parts being broken away and parts shown in elevation of a preferred embodiment of apparatus in accordance with this invention.
Figure 2:
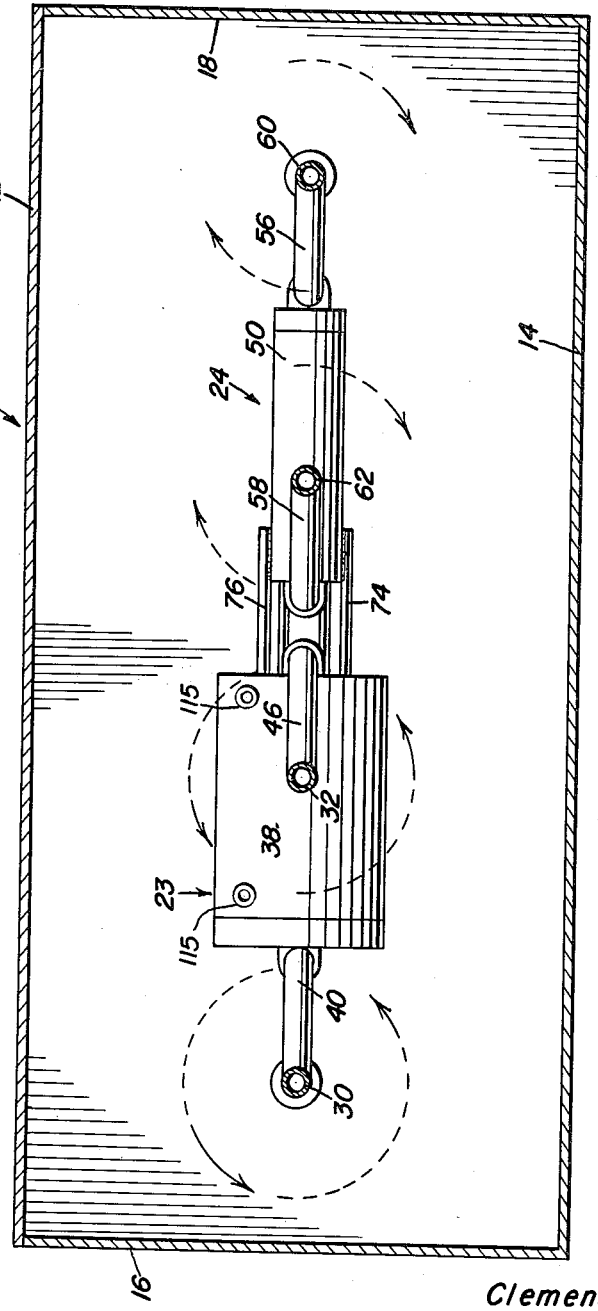
FIGURE 2 is a view in vertical longitudinal section taken substantially upon the plane indicated by the section line 2—2 of FIGURE 1 and indicating by arrows the directions of rotation of various components of the device.
Figure 3:
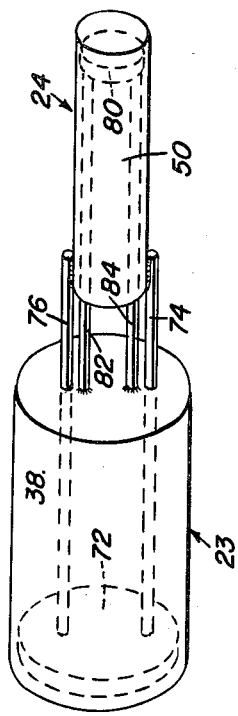
FIGURE 3 is a perspective view showing the manner in which the working cylinder unit and the compressor cylinder unit are operatively connected to each other, the view being somewhat diagrammatic.

Referring first to FIGURES 1 and 2 of the drawings it will be observed that the power plant in accordance with this invention includes a housing or receptacle-like casing designated generally by the numeral 10 and which including top and bottom walls 12 and 14 together with end walls 16 and 18 and a pair of side walls 20 and 22 constitutes an enclosing casing for the working parts of the apparatus. The power plant includes a cylinder and piston power or working unit 23 together with a cylinder and piston compressor unit 24 which are combined together and operatively interconnected and are disposed within the casing 10.

At this point it should be observed that although for simplicity of illustration the power plant or engine consists of a single power unit 23 and a single compressor unit 24 operatively related with each other, any desired number of such units may be employed either in side-by-side relation or at various angular intervals about a common axis in order to obtain the desired power output and capacity of the device.

The two units 23 and 24 are mounted upon crankshafts so that they are capable of simultaneous independent rotation in a synchronized relation but in opposite directions to thus cause a relative movement of the units towards and from each other thereby increasing the effective stroke of the piston elements of the units.

For this purpose it will be noted that a pair of crankshafts 30 and 32 are disposed in parallel relation in the casing 10 and are journalled in the side walls 20 and 22 and serve to rotatably support thereon as by means of bearing members 34 and 36 on the power cylinder 38 upon a crank throw 40 of the crankshaft 30, or corresponding bearing members 42 and 44 disposed on the opposite end walls of the cylinder 38 are similarly journalled upon the crank throw 46 of the crankshaft 32. Thus, the working cylinder 38 is journalled at its opposite ends from the crank throws of the two crankshafts 30 and 32 so that the cylinder is given a rotary motion by travel of the crank throws while being maintained at all times in positions parallel to itself throughout its circular path of travel.

In a similar manner, the compressor cylinder 50 of the compressor unit 24 has its opposite end walls provided with bearings or sleeves at 52 and 54 which are respectively journalled upon the crank throws 56 and 58 of the pair of crankshafts 60 and 62 likewise journalled in the side walls 20 and 22. It will be observed that the crankshafts 30, 32, 60 and 62 have identical crank throws and the axes of these crankshafts lie in the same horizontal plane so that although the sets of crankshafts of the two units rotate in opposite directions as indicated by the arrows in FIGURE 2, the cylinders 38 and 50 and thus the two units 23 and 24 be caused to move through equal paths of travel but in opposite directions. The arrangement is such that perfect synchronization is obtained between the crankshafts as by means of sets of matching bevel gears 64 and 66 carried by the crankshafts and by a lay shaft 68 respectively. The lay shaft is mounted upon the exterior of the casing as for example being journalled in suitable support brackets 70 projecting laterally outwardly from a side wall 22 of the casing 10. By means of the sets of mating gears, it will be appreciated that the crankshafts and their crank throws are maintained positively in a timed relation, and the power is transmitted between the crankshafts and the lay shafts 68. From the lay shafts 68 power is delivered in any desired manner, not shown.

It will further be understood that although all four crankshafts have been shown as being connected by the sets of gearing 64, 66 to the lay shaft 68, it is actually necessary only that one crankshaft of each unit be so connected since the journalling of the cylinders of the two units upon their sets of crankshafts will insure the simultaneous synchronized operation of the crankshafts.

Reference is now made particularly to FIGURES 1–6 for a better understanding of the operative and structural relationship between the power and compressor units 23 and 24. It will be observed that reciprocable within the power cylinder 38 is a power piston 72 which has a pair of parallel piston rods 74 and 76 rigidly attached thereto on opposite sides of the longitudinal axis of the cylinder 38 and which rods extend slidably through the end wall 78 of the power cylinder 38, and are welded or otherwise rigidly secured to the adjacent end portion of the compressor cylinder 50 as shown clearly in FIGURE 3. In a similar manner, the compressor piston 80 which is slidably received in the compressor cylinder 50 likewise has a pair of parallel piston rods 82 and 84 rigidly connected thereto, slidably extended through the end wall 86 of the compressor cylinder 50, and welded or otherwise rigidly attached to the adjacent end wall of the power cylinder 38. Thus, the cylinder of each unit is rigidly connected by piston rods to the piston of the other unit.

As previously mentioned, the opposite end walls of the two cylinders are in turn journalled upon the crank throws of their respective pairs of crank shafts.

As a result of this arrangement the associated slidably connected units 23 and 24 are caused by their associated sets of crankshafts to move through rotary paths in opposite directions of travel but to at all times remain in perfect alinement with each other. Consequently, there is effected a relative reciprocation of the pistons within the cylinders and since the cylinders and pistons are at all times maintained in perfect alinement by their connection to the sets of crankshafts, all side thrust of the pistons within the cylinders is completely eliminated thereby greatly decreasing wear upon the engine. In addition, a much more rapid and a longer stroke of the pistons within the cylinders is effected in this manner.

Referring again to FIGURE 4 it will be observed that the outer ends of the two cylinders 38 and 50 are provided with removable end walls and closures as at 90 and 92 respectively which are threadedly engaged upon the cylinders as shown. The integral end walls 78 and 86 are secured by the previously mentioned bearing sleeves 42, 44 and 54 to their crankshafts 32, 62, while the removable end walls 90 and 92 are secured by the bearing sleeves 34, 36 and 52 to the crankshafts 30 and 60 respectively.

The flow of fluid into and out of the compressor and working cylinders is effected by passage means disposed within the crankshafts and by a valve arrangement to be now described.

It should be now understood that each of the cylinders 38 and 50 and the pistons 72 and 80 therein are double acting, that is, define expansible and contractible working chambers with each of the opposite ends of their respective cylinders. Consequently, valve means are provided for effecting the inlet and exhaust of fluid into and from each end of each cylinder.

By means of a conduit 100 which opens through a side wall 20 of the casing 10 air from the atmosphere or other suitable source is conducted and is delivered by a branch conduit 102 to the hollow interior of the shafts 60 and 62. From these shafts the incoming air is delivered under control of valve means disposed in the bearing sleeves 52, 54 in a manner to be subsequently described to the chambers at the opposite sides of the compressor piston 80 within the compressor cylinder 50. Thus upon each reciprocation of the compressor piston air is inducted and compressed in the two chambers at the opposite sides of the piston in the compressor cylinder 50. The air so compressed is then discharged upon the compression stroke of the piston 80 in each of these compression chambers of the compressor cylinder 50 through hollow passages in the opposite ends of the shafts 60 and 62 from whence the compressed air is delivered by conduit 104 and is then discharged as by nozzles 106 into the interior of the casing 10. The casing 10 thus comprises an air reservoir or air receiver for storing the compressed air.

The compressed air with which the casing 10 is thus charged in turn is delivered into the working cylinder 38 by a somewhat similar arrangement. Thus, inlet nozzles 108 formed at the mid portion of a conduit 110 deliver the compressed air into the hollow portions of the crankshafts 30 and 32 from whence the air passes by means of valve mechanisms to be subsequently set forth disposed in the bearing members 36 and 44 into opposite ends of the working cylinder 38 to thus impel the piston 72 upon its working strokes. Upon the completion of the working stroke, the exhaust products are educted from the opposite working chambers on opposite sides of the piston 72 through valves in the fittings 34, 42 to be later described, and through hollow passages in the crankshafts 30 and 32, through the branch conduit 112 which communicates with the hollow portions of these shafts, and through an exhaust conduit 114 extending into the interior of the casing 10 as through the wall 20 thereof.

The manner in which the conduits 102, 104, 110 and 112 establish communication with the passages in the hollow crankshafts is clearly indicated at the right hand end of the conduit 112 where the latter is shown as having a continuous communication with the interior of the hollow crankshaft 32.

At this point it is desired to emphasize that fuel is introduced into and is burned in the air in any suitable manner. For example, fuel from any suitable source, not shown, could be directly introduced by a conduit 107 and a nozzle or nozzles 105 into the interior of the casing 10 and into the air discharged thereinto through the nozzles 106. There would thus result in the casing 10 being filled with highly heated products of combustion which owing to the excess of air would be completely oxidized. With this arrangement the nozzle 108 would then receive this pressurized heated combustion products and employ them to effect operation of the working piston 72.

Alternatively, fuel from any suitable source, not shown, could be introduced by a conduit 111 and then by nozzle 113 could be injected into the compressed air after the latter enters the nozzles 108, again with an excess of air over fuel in order to obtain and insure complete combustion, and the combustion products would again be delivered to the working chambers on opposite sides of the piston 72 in the working cylinder 38. Finally, if desired, the fuel could be directly introduced into the working chambers on opposite sides of the piston 72 by any suitable means. Inasmuch as the precise means by which the fuel is introduced into and burned in the air is immaterial for the purpose of this invention it has been deemed unnecessary to disclose any particular arrangement for this purpose, although that illustrated in my above-identified prior patent may be satisfactorily employed for this purpose.

Any suitable igniters such as those diagrammatically indicated at 115 may be provided in the cylinder 38 to effect ignition of the charge therein.

An important feature of this invention is that there is no sudden explosion or shock of combustion in the working cylinder and to which the latter and the working piston are subjected. Instead, the heated gaseous products act rather as a constant pressure fluid to effect reciprocation of the piston in the working chambers thereby insuring a substantially uniform application of pressure to the piston throughout the stroke of the latter thereby lowering peak pressures and obtaining a more uniform thrust upon the piston and the associated crankshaft. It will be noted that the thrust is imparted both to the piston 72 and the connecting rods 74, 76 and also to the cylinder 38, the crankshafts 30 and 62 thus all four of the crankshafts at all times receiving the thrust of the expanding gases in the working cylinder from the opposite ends of the working piston.

In addition to its function as a pressure reservoir, the casing 10 serves as a complete enclosure for all the moving parts of the engine, and further serves as a means to equalize the temperatures between the compressor and working cylinders. The temperature changes and conditions are as follows:

The interior of the compressor cylinder 50 is cooled by the introduction of fresh air through the crankshafts 60 and 62 thereinto, and this air is heated in the cylinders under the compression stroke of the piston 80 and is discharged as highly heated air into the casing 10 through the nozzles 106. The heated gaseous fluid in the casing 10 thus serves to maintain both of the cylinders 50 and 38 at a relatively constant temperature. The interior of the working cylinder 38 is cooled to some extent by the expansion stroke of the fluids therein, while the exterior of the cylinder is warmed by the presence of the surrounding gaseous medium.

From an inspection of FIGURE 4 it will be observed that the hollow crankshafts with their crank throws 40, 46, 54 and 52 are provided with partitions as at 120, 122, 124 and 126 respectively. The hollow passages of the crank throws on one side of the partition are thus separated from those on the other side and constitute independent intake and exhaust passages for the respective chambers in the respective cylinders. On each side of a partition in the crank throws a rotary valve is provided by means of cooperating ports 130 in the crank throw and 132 in the adjacent end wall of the associated cylinder. The arrows in FIGURE 4 indicate the direction of flow of the fluids in the position of the parts as shown in FIGURE 4. In the interest of simplicity the same numerals 130, 132 have been given to the registering ports in the crank throws and in the cylinder end walls. It will be understood, however, that the relative position of these ports will be so selected and chosen as to afford the properly timed operation of the rotary valves in order that the cyclic operation may occur. From a study of the detail views of FIGURES 7–14 it will be observed that each of the eight rotary control valves will during each revolution of the crank throws effect one opening of the ports controlled thereby. In order to facilitate an understanding of one suitable timed relationship between the various valves, the numeral 140 has been given to the crank throw 40 and the inlet passage thereof, while the exhaust passage upon the opposite side of the partition 120 is designated by the numeral 142. Similarly, the intake passage of the crank throw 46 is represented by the numeral 144 while the exhaust passage thereof is indicated by the numeral 146. The numeral 148 designates the exhaust passage of the crank throw 58 of the compressor unit while the numeral 150 designates the intake passage thereof. Similarly, the numeral 152 represents the exhaust passage portion of the crank throw 52 while the intake passage thereof is represented by the numeral 154.

From the foregoing it will be apparent that a very simple rotary control valve mechanism is provided for effecting the proper inlet of fluid into and the discharge of fluid from each of the two chambers of the two cylinders. These rotary valves also serve as the bearing means by which the two cylinders are in turn journalled upon the crank throws of their respective crankshafts.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power plant comprising two pairs of parallel crankshafts having equal throws, a power cylinder journalled upon the throws of one pair of crankshafts and a compressor cylinder journalled upon the throws of the other pairs of crankshafts, a piston slidable in each cylinder, piston rods connecting the piston in one cylinder to the other cylinder for simultaneous movement therewith, means for rotating the pairs of crankshafts in opposite directions in synchronized relation whereby to maintain the cylinders and pistons in a straight line relation throughout their rotation by the crankshafts, means for effecting the intake and exhaust of fluid into and from each end of each cylinder including means for introducing an expansible motive fluid into each end of said power cylinder.

2. The combination of claim 1, wherein the end walls of each cylinder have bearing means by which the cylinder is journalled upon the associated pair of crankshafts.

3. The combination of claim 2, wherein the intake and exhaust means of said cylinders are carried by said bearing means.

4. The combination of claim 1, wherein said means for effecting the intake and exhaust of fluids includes fluid passages in each crankshaft, control valves effecting timed communication of each of said fluid passages with the interior of each cylinder.

5. The combination of claim 4, wherein the intake and exhaust from each end of a cylinder is effected by axially alined passages in the same crankshaft.

6. The combination of claim 1, including a casing enclosing said cylinders and pistons and comprising an air reservoir with which the compressor cylinder exhaust means and the power cylinder intake means communicate.

7. The combination of claim 1, including bearing means on the said cylinders journaling said crankshafts, said intake and exhaust means of said cylinders being carried by said bearing means.

8. The combination of claim 1, wherein the piston in each cylinder has a pair of piston rods rigidly secured thereto and to the other cylinder.

9. The combination of claim 1, wherein the last-mentioned means includes a lay shaft, gearing connecting said lay shaft to at least one crankshaft of each pair of crankshafts.

10. An internal combustion device comprising a pair of axially aligned but spaced power and compressor cylinders, a double acting piston slidably disposed in each cylinder, means connecting each piston with the cylinder of the other piston for movement therewith, means connected to the opposite ends of each cylinder for supporting said cylinders and pistons for rotating movement in parallel positions of alignment about a closed path of travel, means for introducing air alternately into opposite ends of said compressor cylinder, means for exhausting compressed air from opposite ends of said compressor cylinder, means for introducing fuel into said compressed air and forming a combustible mixture, means for introducing said combustible mixture alternately into opposite ends of said power cylinder, means for igniting said combustible mixture in said power cylinder, means for exhausting combustion products alternate from opposite ends of said power cylinder.

11. The combination of claim 10 wherein the means for introducing and the means for exhausting of each cylinder are operated in timed relation by said cylinder supporting means.

12. The combination of claim 10 including a casing surrounding both said cylinders, said compressor cylinder exhaust means and said power cylinder mixture introducing means communicating with said casing.

13. The combination of claim 10 wherein said fuel introducing means introduce fuel into said compressed air prior to discharge of the latter into said casing.

14. The combination of claim 10 wherein said fuel introducing means introduces fuel into said compressed air after the latter is withdrawn from said casing by said compressed air introducing means.

References Cited in the file of this patent
UNITED STATES PATENTS

| | | |
|---|---|---|
| 1,382,611 | Augustine | June 28, 1921 |
| 1,583,560 | Morris | May 4, 1926 |